United States Patent
Shaw et al.

(10) Patent No.: US 7,899,097 B1
(45) Date of Patent: Mar. 1, 2011

(54) SYNCHRONIZED DELAY-COUPLED LASER SYSTEM

(75) Inventors: Leah B Shaw, Williamsburg, VA (US); Ira B Schwartz, Bethesda, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/328,222

(22) Filed: Dec. 4, 2008

Related U.S. Application Data (60) Provisional application No. 61/012,231, filed on Dec. 7, 2007.

(51) Int. Cl.
*H01S 3/10* (2006.01)
*H01S 3/13* (2006.01)
*H01S 3/083* (2006.01)

(52) U.S. Cl. .................. 372/29.02; 372/9; 372/94
(58) Field of Classification Search ............. 372/6, 372/92, 94, 9, 29.02
See application file for complete search history.

(56) References Cited

PUBLICATIONS

Klein, Einat and Gross, Noam and Rosenbluh, Michael and Kinzel, Wolfgang and Khaykovich, Lev and Kanter, Ido}, "Stable isochronal synchronization of mutually coupled chaotic lasers", Physical Review E, vol. 73, No. 6, Part 2 (Jun. 2006).*

Kim, MY and Roy, R and Aron, JL and Carr, TW and Schwartz, IB, "Scaling behavior of laser population dynamics with time-delayed coupling: Theory and experiment", Physical Review Letters, vol. 94, No. 8, Article-No. 088101 (Mar. 4, 2005).

Williams, QL and Garcia Ojalvo, J and Roy, R, "Fast intracavity polarization dynamics of an erbium-doped fiber ring laser: Inclusion of stochastic effects", Physical Review A, vol. 55, No. 3, pp. 2376-2386 (Mar. 1997).

Shaw, LB and Schwartz, IB and Rogers, EA and Roy, R, "Synchronization and time shifts of dynamical patterns for mutually delay-coupled fiber ring lasers", CHAOS, vol. 16, No. 1, Article-No. 015111 (Mar. 2006).

\* cited by examiner

*Primary Examiner*—Armando Rodriguez
(74) *Attorney, Agent, or Firm*—Amy L. Ressing; L. George Legg (57) ABSTRACT

A synchronized delay-coupled laser system includes at least two lasers. Each laser includes a laser fiber with a coupling means for coupling to a laser pump. The lasers are coupled to each other by way of two optical fibers. Each laser also includes a self-feedback section. The optical fibers interconnecting the lasers and the self-feedback sections are configured to provide a substantially identical delay time. The lasers may be ring lasers, may be semi-conductor or solid state, and may include components such as a fiber amplifier, a polarization controller, and a nonlinear oscillator. The system includes multiple interconnected lasers and also employ cross-coupling connections.

8 Claims, 11 Drawing Sheets

SYNCHRONIZED DELAY-COUPLED LASER SYSTEM

CROSS-REFERENCE TO RELATED APPLICATIONS

This Application is a Non-Prov of Prov (35 USC 119(e)) application 61/012,231 filed on Dec. 7, 2007, incorporated herein by reference.

BACKGROUND OF THE INVENTION

Synchronization of networked, or coupled, systems has been examined for large networks of identical (Pikovsky, A and Rosenblum, M and Kurths, J, "Synchronization: A universal concept in nonlinear science," Cambridge university press, Cambridge, 2001) and heterogeneous oscillators, for example as described in Restrepo, J G and Ott, E and Hunt, B R, "Emergence of coherence in complex networks of heterogeneous dynamical systems", PHYSICAL REVIEW LETTERS, Volume 96, Number 25, Article-Number 254103 (Jun. 30, 2006). For coupled systems with smaller numbers of oscillators, several new dynamical phenomena have been observed, including generalized (Rulkov, N F and Sushchik, M M and Tsimring, L S and Abarbanel, H D I, "Generalized synchronization of chaos in directionally coupled chaotic systems", PHYSICAL REVIEW E, Volume 51, Number 2, Pages 980-994 (February 1995)), phase (Rosenblum, M G and Pikovsky, A S and Kurths, J, "Phase synchronization of chaotic oscillators", PHYSICAL REVIEW LETTERS, Volume 76, Number 11, Pages 1804-1807 (Mar. 11, 1996)), and lag (Rosenblum, M G and Pikovsky, A S and Kurths, J, "From phase to lag synchronization in coupled chaotic oscillators", PHYSICAL REVIEW LETTERS, Volume 78, Number 22, Pages 4193-4196 (Jun. 2, 1997)) (hereinafter "Rosenblum et al.") synchronization. Lag synchronization, in which there is a phase shift between observed signals, is one of the routes to complete synchrony as coupling is increased (Rosenblum et al.) and may occur without the presence of delay in the coupling terms.

For systems with delayed coupling, a time lag between the oscillators is typically observed, with a leading time series followed by a lagging one. Such lagged systems are said to exhibit achronal synchronization. In Heil, T and Fischer, I and Elsasser, W and Mulet, J and Mirasso, C R, "Chaos synchronization and spontaneous symmetry-breaking in symmetrically delay-coupled semiconductor lasers", PHYSICAL REVIEW LETTERS, Volume 86, Number 5, Pages 795-798 (Jan. 29, 2001), the existence of achronal synchronization in a mutually delay-coupled semiconductor laser system was shown experimentally, and in White, J K and Matus, M and Moloney, J V, "Achronal generalized synchronization in mutually coupled semiconductor lasers", PHYSICAL REVIEW E, Volume 65, Number 3, Part 2A, Article-Number 036229 (March 2002), studied theoretically in a single-mode semiconductor laser model. In the case of short coupling delay for unidirectionally coupled systems, anticipatory synchronization occurs when a response in a system's state is not replicated simultaneously but instead is anticipated by the response system (Voss, H U, "Anticipating chaotic synchronization", PHYSICAL REVIEW E, Volume 61, Number 5, Part A, Pages 5115-5119 (May 2000); and Voss, Hu, "Dynamic long-term anticipation of chaotic states", PHYSICAL REVIEW LETTERS, Volume 8701, Number 1, Article-Number 014102 (Jul. 2, 2001)), and an example of anticipation in synchronization is found in coupled semiconductor lasers (Masoller, C, "Anticipation in the synchronization of chaotic semiconductor lasers with optical feedback", PHYSICAL REVIEW LETTERS, Volume 86, Number 13, Pages 2782-2785 (Mar. 26, 2001)). Cross-correlation statistics between the two intensities showed clear maxima at delay times consisting of the difference between the feedback and the coupling delay. Anticipatory responses in the presence of stochastic effects have been observed in models of excitable media (Ciszak, M and Calvo, O and Masoller, C and Mirasso, C R and Toral, R, "Anticipating the response of excitable systems driven by random forcing", PHYSICAL REVIEW LETTERS, Volume 90, Number 20, Article-Number 204102 (May 23, 2003)). Noise further complicates the picture in that theory and experiment may exhibit achronal synchronization, with switching between leader and follower (Mulet, J and Mirasso, C and Heil, T and Fischer, I, "Synchronization scenario of two distant mutually coupled semiconductor lasers", JOURNAL OF OPTICS B-QUANTUM AND SEMICLASSICAL OPTICS, Volume 6, Number 1, Pages 97-105 (January 2004)).

Given that both lag and anticipatory dynamics may be observed in delay-coupled systems, it is natural to ask whether the isochronal (zero-lag) state, in which there is no phase difference in the synchronized time series, may be stabilized in coupled systems. A recent example of stable isochronal synchronization may be found in Klein, Einat and Gross, Noam and Rosenbluh, Michael and Kinzel, Wolfgang and Khaykovich, Lev and Kanter, Ido}, "Stable isochronal synchronization of mutually coupled chaotic lasers", PHYSICAL REVIEW E, Volume 73, Number 6, Part 2, Article-Number 066214 (June 2006), incorporated herein by reference, which considers two coherently coupled semiconductor lasers.

BRIEF SUMMARY OF THE INVENTION

According to the invention, a synchronized delay-coupled laser system includes at least two lasers. Each laser includes a laser fiber (or a semiconductor laser) with a coupling means for coupling to a laser pump. The lasers are coupled to each other by way of two optical fibers. Each laser also includes a self-feedback section. The optical fibers interconnecting the lasers and the self-feedback sections are configured to provide a substantially identical delay time. The lasers may be ring lasers, may be semi-conductor or solid state, and may include components such as a fiber amplifier, a polarization controller, and a nonlinear oscillator. The system includes multiple interconnected lasers and also employ cross-coupling connections.

The laser system has applications in receivers and transmitters used in communications systems, in mobile tactical high energy laser systems, maritime self defense applications, counter munitions, and coherent beam control.

BRIEF DESCRIPTION OF THE DRAWINGS

FIG. 1 shows an example of the intensities of delay-coupled ring lasers without self feedback (FIG. 1A), and with self feedback (FIG. 1B) according to the invention;

FIG. 3A shows all transverse Lyapunov exponents while

DETAILED DESCRIPTION OF THE INVENTION

The invention uses global coupling with self feedback in two situations: 1. Incoherent delay-coupled semiconductor systems, as described in Kim, M Y and Roy, R and Aron, J L and Carr, T W and Schwartz, I B, "Scaling behavior of laser population dynamics with time-delayed coupling: Theory and experiment", PHYSICAL REVIEW LETTERS, Volume 94, Number 8, Article-Number 088101 (Mar. 4, 2005), incorporated herein by reference; and 2. Coupled spatio-temporal systems consisting of coupled fiber ring lasers, as described in Williams, Q L and GarciaOjalvo, J and Roy, R, "Fast intracavity polarization dynamics of an erbium-doped fiber ring laser: Inclusion of stochastic effects", PHYSICAL REVIEW A, Volume 55, Number 3, Pages 2376-2386 (March 1997), incorporated herein by reference, and with delay, as described in Shaw, L B and Schwartz, I B and Rogers, E A and Roy, R, "Synchronization and time shifts of dynamical patterns for mutually delay-coupled fiber ring lasers", CHAOS, Volume 16, Number 1, Article-Number 015111 (March 2006), incorporated herein by reference (hereinafter "Shaw et al.").

We consider N coupled oscillators of the following form. Let F denote an m-dimensional vector field, B an m×m matrix, and $\kappa_j$, where $j=1 \ldots N$, denote the coupling constants. For the cases we examine here, we consider global coupling including self feedback:

$$\frac{dx_i(t)}{dt} = F(x_i(t), x_i(t-\tau)) + \sum_{j \neq i} \kappa_i B x_j(t-\tau) \tag{1}$$

Given the structure of Eq. 1, we examine the stability transverse to the synchronized state, $S=\{x_i(t): x_i(t)=s(t), i=1, \ldots, N\}$, by defining $\eta_{ij}=x_j-x_i$. The linearized variations in the direction transverse to S are then given by $$\frac{d\eta_{ij}(t)}{dt} = D_1 F(x_i(t), x_i(t-\tau))\eta_{ij}(t) + \tag{2}$$
$$D_2 F(x_i(t), x_i(t-\tau))\eta_{ij}(t-\tau) + (\kappa_i - \kappa_j)Bx_i(t-\tau) - \kappa_j B\eta_{ij}(t-\tau)$$

where $D_i$ denotes the partial derivative with respect to the ith argument.

We make the following hypotheses (H's) to simplify the analysis: (H1): Assume that the dependence on the time delayed variables in F takes the same form as the delay coupling; i.e., $D_2F(x,y)=B\kappa_j$. (H2): Let $\kappa_i=\kappa_j=\kappa$, $i=1 \ldots N$. Equation 2 then simplifies to $$\frac{d\eta_{ij}(t)}{dt} = D_1 F(x_i(t), x_i(t-\tau))\eta_{ij}(t), \tag{3}$$

where it is understood the arguments of the derivatives are computed along the synchronized solution s(t), and the solution is a function of parameters such as coupling and delay. Computing Eq. 3 along the synchronized state will generate the Lyapunov exponents for the transverse directions, and we examine the effect of coupling and delay by computing the cross-correlations between time series as well.

To examine the stability of the isochronally synchronized state of Eq. 1, we model N=3 lasers that are pump coupled. An isolated semiconductor laser's dynamics at the ith node is governed by $$\frac{dz_i}{dt} = \overline{F}(z_i), z_i = (x_i, y_i), \text{ where } \overline{F}(z) = [-y - \varepsilon x(a+by), x(1+y)], \tag{4}$$

and x,y are the scaled carrier fluctuation number and normalized intensity fluctuations about zero, respectively. $\epsilon^2$ is the ratio of photon to carrier lifetimes, and a and b are dimensionless constants (see Schwartz, I B and Erneux, T, "Subharmonic hysteresis and period-doubling bifurcations for a periodically driven laser", SIAM JOURNAL ON APPLIED MATHEMATICS, Volume 54, Number 4, Pages 1083-1100 (August 1994), incorporated herein by reference, for details on the derivation).

Figure 1A:
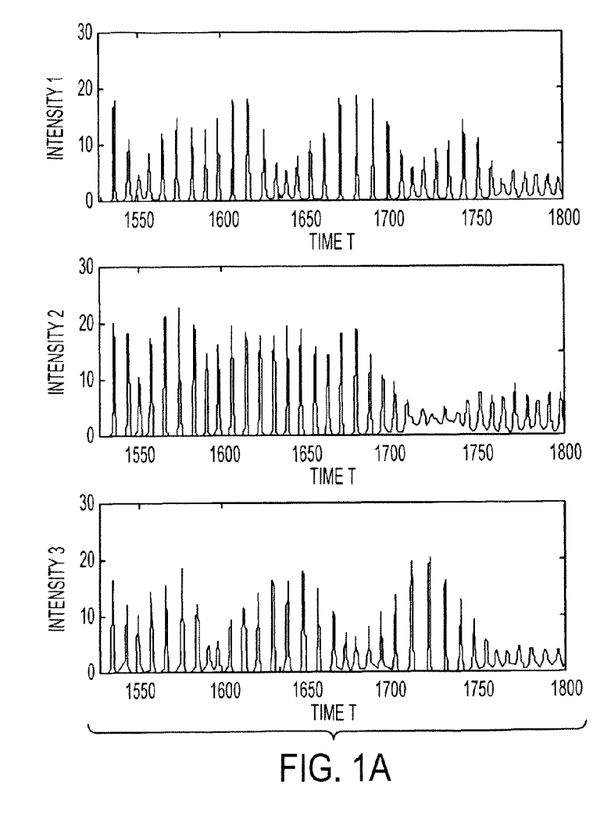
Figure 1B:
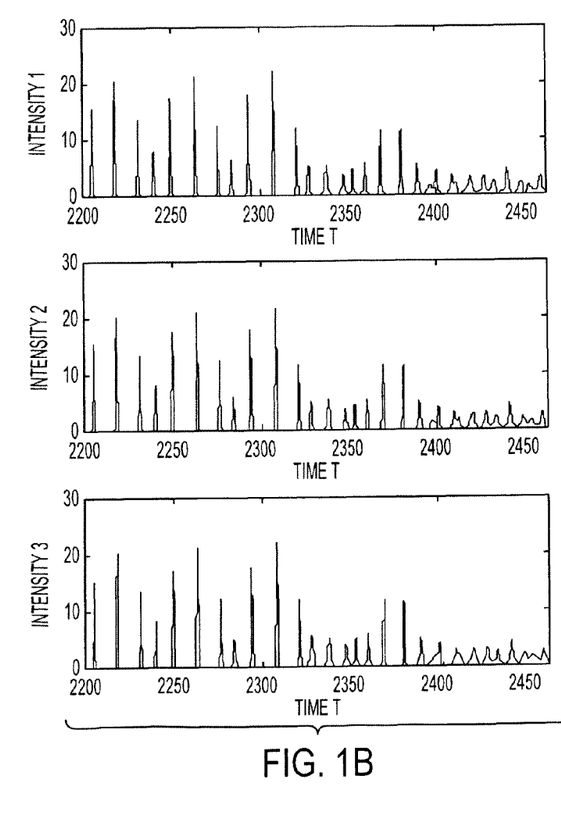

The coupling strengths are $\kappa_i=\kappa_j=\kappa$, i=1,2,3. This leads to the following set of differential equations for the system:

$$\frac{dz_i}{dt} = \overline{F}(z_i(t)) + \kappa \sum_{i=1}^{3} Bz_i(t-\tau), i=1, 2, 3, \tag{5}$$

where m=2, and B(1,2)=1, with all other entries in B equal to 0. FIG. 1 is an example of the intensities without (FIG. 1A) and with (FIG. 1B) self feedback and shows explicitly the effect of self feedback in stabilizing the isochronal solution, where isochronal synchrony does not occur in the former but does in the latter. It provides an example of delay-coupled dynamics showing intensities computed for N=3. $\kappa=3.0\epsilon$, $\tau=30$, a=2, b=1, and $\epsilon=(0.001)^{1/2}$, using Eq. 4. Writing down the differential equation for the transverse directions in matrix form for Eq. 5 using Eq. 3 and expanding near the synchronized solution $\eta_{ij}=0$, we obtain:

$$X'(t)=A(t, \kappa, \tau, \epsilon)X(t), \tag{6}$$

where $A(t,\kappa,\tau,\epsilon)=DF(s(t,\kappa,\tau,\epsilon))$, and X(0)=I. Due to the nature of the global coupling with self feedback, each node receives the same signal. Therefore, the transverse stability does not explicitly depend on the coupling or delay, but rather on the dynamics of local nodes. To examine the stability of the isochronal state, we derive some properties of the transverse Lyapunov exponents (TLEs). The TLEs satisfy the following limit:

$$\lambda(x_0, y_0, u) = \lim_{t \to \infty} \frac{1}{t} \log \frac{\|X(t)u\|}{\|u\|}.$$

Here u is a vector in a given direction.

By computing the solution to the linear variational equations along a given solution, we can extract the TLEs. To examine the scaling behavior of the TLEs, let $\Delta(t,\kappa,\tau,\epsilon)=\det(X(t,\kappa,\tau,\epsilon))$. Then, we have that $$\Delta(t, \kappa, \tau, \varepsilon) = \exp\left(\int_0^t \text{trace}(A(s, \kappa, \tau, \varepsilon))\,ds\right).$$

Taking the logarithm of the matrix solution, and noting the determinant of a matrix is the product of its eigenvalues, we have:

$$\sum_{i=1}^m \lambda(x_0, y_0, e_i) = \lim_{t \to \infty} \frac{1}{t} \log |\det(X(t, \kappa, \tau, \varepsilon)|, \quad (7)$$

where $e_i$ are independent basis vectors. Equation 7 yields a rate of volume change in the dynamics in the transverse directions. The solution may still be chaotic with one or more exponents being positive, but if sufficiently dissipative, phase space volumes will shrink over time.

From Eq. 4, since trace$(A(t,\kappa,\tau,\epsilon))=-\epsilon(a+by(t,\kappa,\tau,\epsilon)+x(t,\kappa,\tau,\epsilon)$, and assuming the inversion, $x(t,\kappa,\tau,\epsilon)$ has zero time average due to symmetry (which is observed numerically), we have $\int \text{trace}(A(s,\kappa,\tau,\epsilon))ds=-\epsilon(a+b\langle y_{\kappa,\tau,\epsilon}\rangle)t$ and from Eq. 7, we have $$\lambda(x_0,y_0,e_1)+\lambda(x_0,y_0,e_2)=-\epsilon(a+b\langle y_{\kappa,\tau,\epsilon}\rangle). \quad (8)$$

Figure 2:
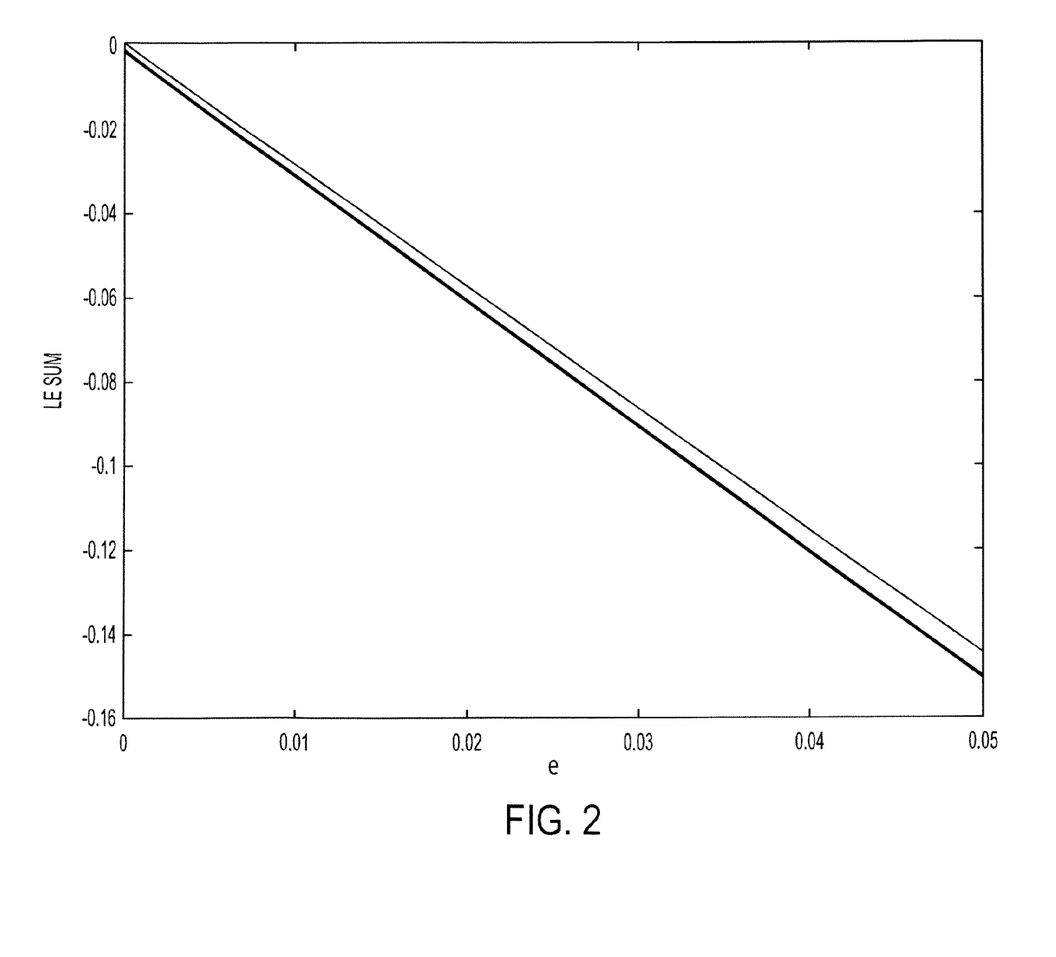
FIG. 2 shows how the sum of the TLEs scales with and compares with numerical experiments according to the invention.

Since $\epsilon$ appears explicitly, it is easy to see how the sum of the TLEs scales with $\epsilon$ and compares with numerical experiments as in FIG. 2. This is a prediction of the scaling of the sum of transverse Lyapunov exponents for Eq. 5 with respect to $\epsilon$.

Figure 3A:
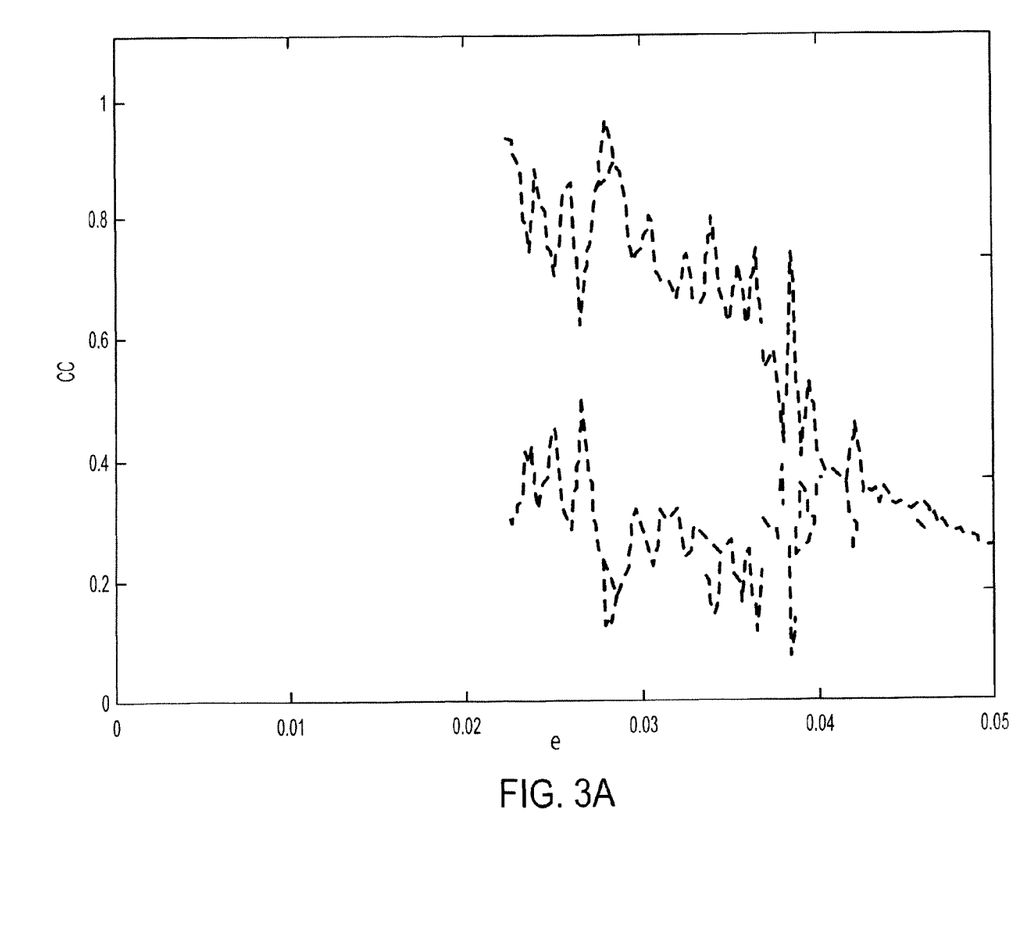
Figure 3B:
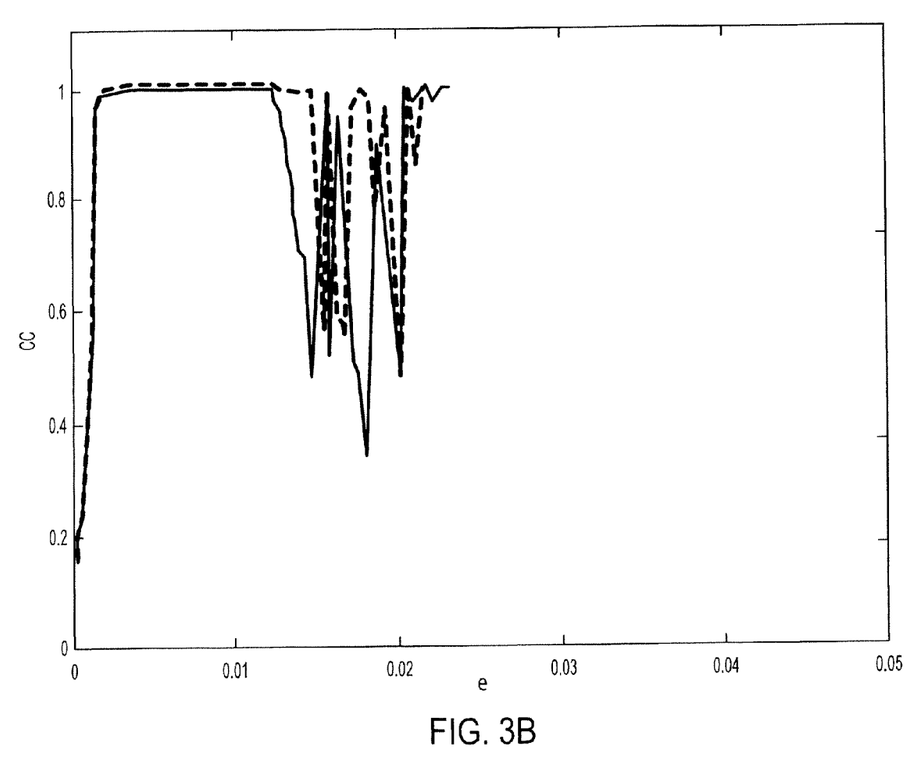
FIG. 3B shows cross-correlation of the dynamics for the same conditions as in FIG. 2.
Figure 4:
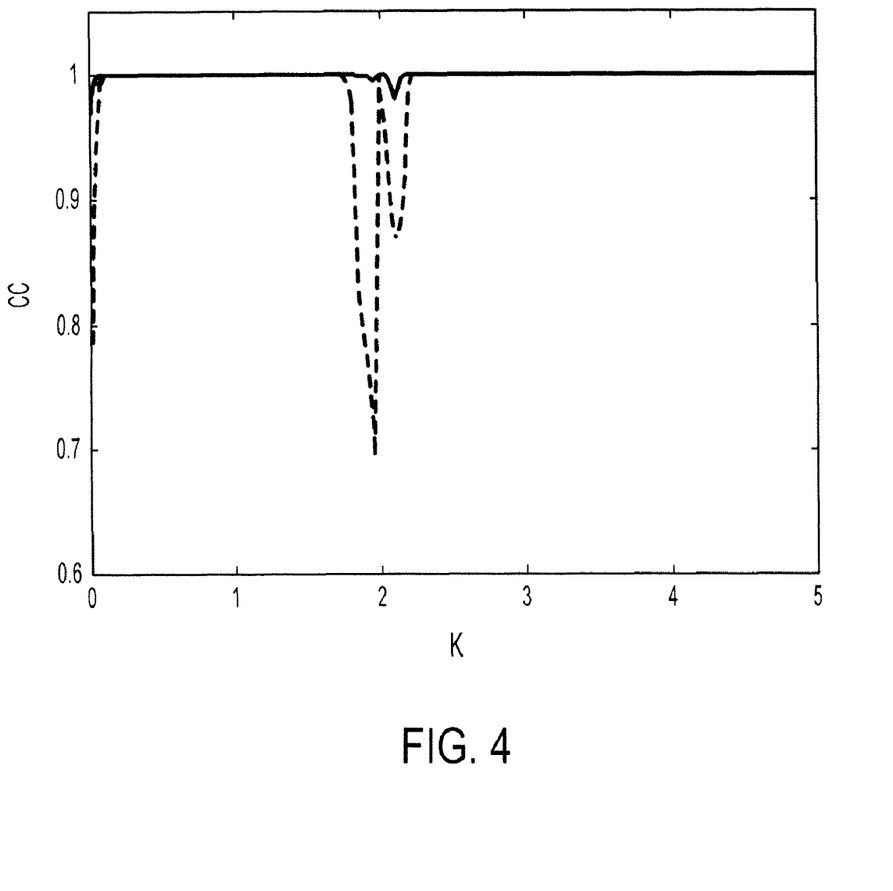
FIG. 4 shows the stability of isochronal synchrony with respect to variations in coupling strength κ according to the invention.

Although the sum of the TLE is negative, loss of synchrony due to instability may occur at intermediate values of $\epsilon$, as seen in FIGS. 3A-B. FIG. 3A shows all transverse Lyapunov exponents while FIG. 3B shows cross-correlation of the dynamics for the same conditions as in FIG. 2. FIG. 3B shows the cross-correlation between lasers 1 and 2 (solid line) and 2 and 3 (dashed line). For most values of shown here, a cross-correlation of 1 is achieved when the shift between the time traces is zero, showing that the isochronal solution is stable. Regions where the isochronally synchronized solution is unstable are associated with one or more positive transverse Lyapunov exponents. On the other hand, for sufficiently large damping, the transverse exponents reveal a stronger overall reduction in the phase space volume. The stability of isochronal synchrony with respect to other parameters can also be computed, e.g., as shown in FIG. 4 for variations in coupling strength κ. It shows the cross-correlation between lasers 1 and 2 (solid line) and 2 and 3 (dashed line) vs. coupling κ for Eq. 5. Other parameters are the same as for FIG. 1B.

In one embodiment of the invention, a self feedback structure for generating isochronal synchronization in delay coupled systems is composed of coupled fiber ring lasers. A fiber ring laser system without self feedback was studied in Shaw et al., and the invention provides an advance in this technological application to include self feedback terms, as follows.

Figure 5A:
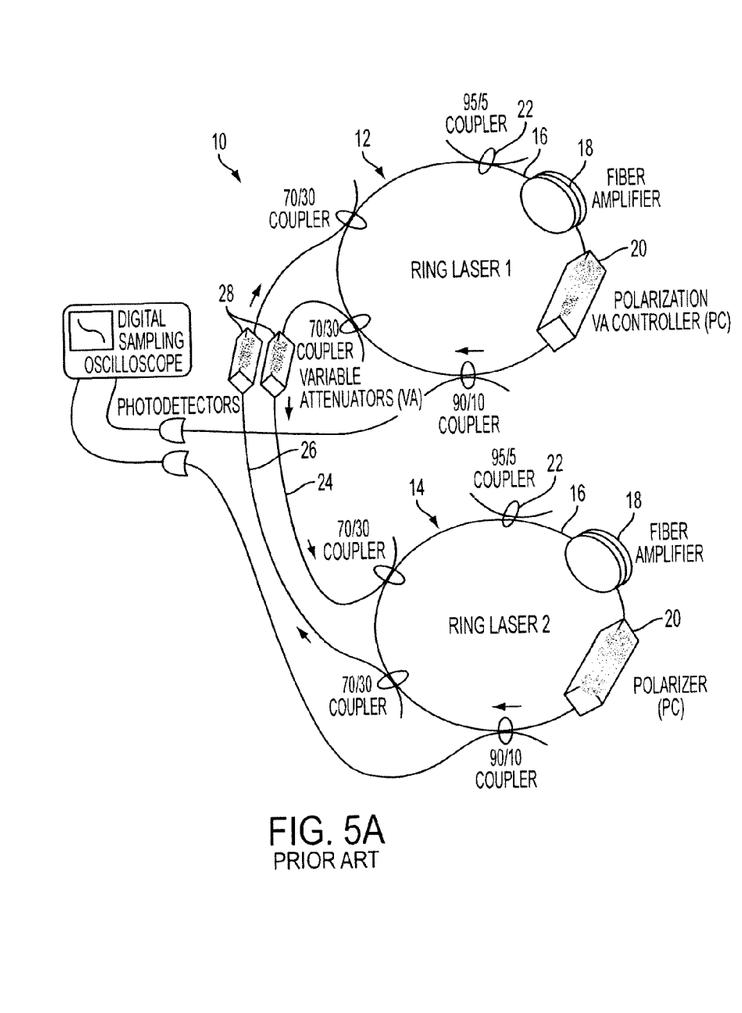
FIG. 5A illustrates a prior art synchronized delay-coupled laser system and FIG. 5B is a schematic illustrating the same mutual coupling of the lasers of FIG. 5A.

Referring now to FIG. 5A, a prior art synchronized delay-coupled laser system 10 includes a first ring laser 12 and a second ring laser 14. Each ring laser 12 and 14 includes an active lasing region. In each ring laser, light circulates through a ring 16 of optical fiber, at least part of which is doped for stimulated emission. Each ring 16 includes a fiber amplifier 18 coupled to a polarization controller 20. Each ring 16 also includes a coupler 22 for coupling to a laser light pump 23 (not illustrated). Passive fibers 24 and 26 mutually couple the lasers 12 and 14 to each other via a variable attenuator 28 in each, allowing coherent light to travel from laser 12 to laser 14 and vice versa. Test were run, and the test setup is shown, including the digital sampling oscilloscope coupled via a photodetector to each ring laser. In the experimental configuration, the erbium ions in the active medium are pumped with identical 980 nm semiconductor lasers at a pump power of 120 mW. Other types of laser pumps may also be used with the invention, e.g. solid state lasers operating at other selected laser light frequencies.

Figure 5B:
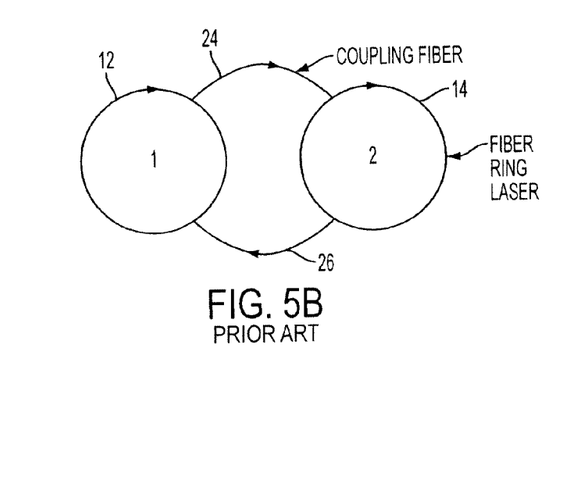

FIG. 5B is a schematic illustrating the same mutual coupling of lasers 12 and 14. The lengths of coupling fibers 24 and 26 are approximately equal in order to obtain a fixed coupling delay between the lasers [through both].

The time for light to circulate through ring 16 is the cavity round-trip time $\tau_R$, and the delay time in the coupling and self feedback lines is a second delay $\tau_d$. Each ring laser is characterized by a total population inversion W(t) and an electric field E(t). The equations for the model dynamics of the jth laser are as follows:

$$E_j(t) = R\exp[\Gamma(1-i\alpha_j)W_j(t) + i\Delta\phi]E_j^{fdb}(t) + \xi_j(t) \quad (10)$$

$$\frac{dW_j}{dt} = q - 1 - W_j(t) - |E_j^{fdb}(t)|^2 \{\exp[2\Gamma W_j(t)] - 1\}$$

The electric field from earlier times which affects the field at time t is $$E_j^{fdb}(t) = E_j(t-\tau_R) + \sum_{l \neq j} \kappa_l E_l(t-\tau_d) + \kappa_j E_j(t-\tau_d). \quad (11)$$

$E_j(t)$ is the complex envelope of the electric field in laser j, measured at a given reference point inside the cavity. $E_j^{fdb}(t)$ is a feedback term that includes optical feedback within laser j and optical coupling with the other laser. Time is dimensionless. Energy input is given by the pump parameter q. Each electric field is perturbed by independent complex Gaussian noise sources, $\xi_j$, with standard deviation D. We use a fixed input strength for all coupling terms: $\kappa_j = \kappa_j = \kappa$ for all i. (Values of the parameters in the model as well as further computational details can be found in Shaw et al. The only difference in parameters was that the lasers are not detuned relative to each other in the invention.)

Because of the feedback term $E_j^{fdb}(t)$ in Eq. 9, one can think of Eq. 9 as mapping the electric field on the time interval $[t-\tau_R, t]$ to the time interval $[t, t+\tau_R]$ in the absence of coupling ($\kappa_j=0$). Equivalently, because the light is traveling around the cavity, Eq. 9 maps the electric field at all points in the ring at time t to the electric field at all points in the ring at time $t+\tau_R$.

We can thus construct spatio-temporal plots for E(t) or the intensity $I(t)=|E(t)|^2$ by unwrapping E(t) into segments of length $\tau_R$.

Figure 6A:
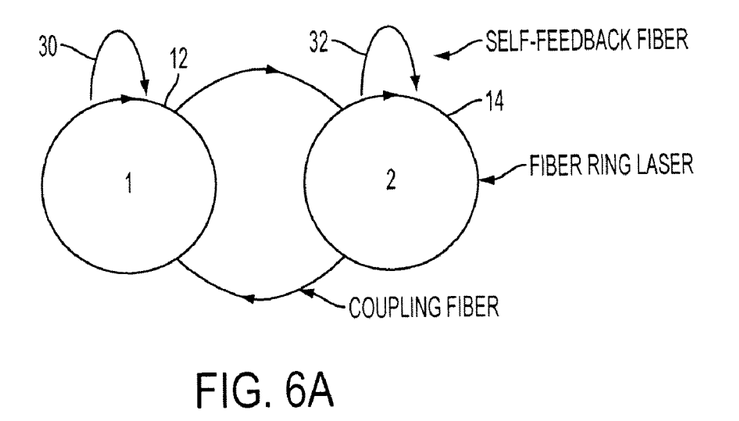
FIG. 6A shows the invention for two coupled lasers with self-feedback.
Figure 6B:
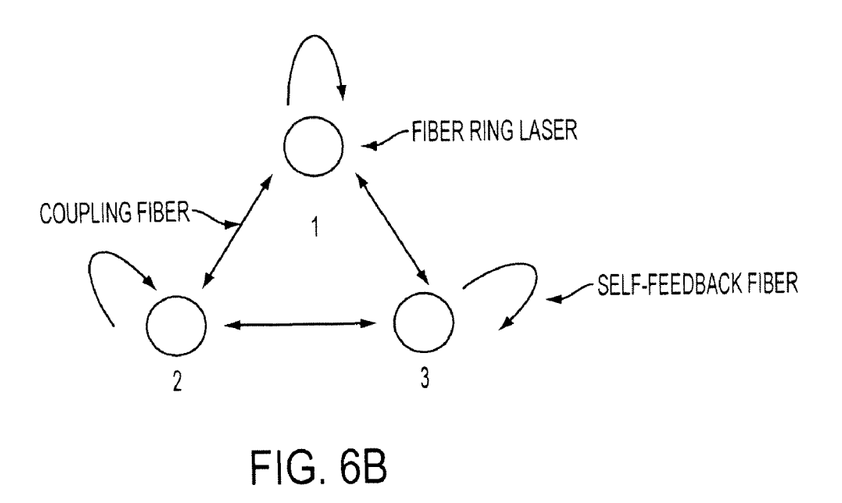
FIG. 6B shows the setup for three lasers, according to the invention.

Referring now to FIG. 6, a configuration of the invention is shown for stabilizing the in-phase, or zero-lag, state between the fiber ring lasers 12 and 14. FIG. 6A shows the two lasers, which are mutually coupled, including the added feature of an additional self feedback loop 30 and 32 for each laser The self feedback loops 30 and 32 are again passive fibers, with the same length as the mutual coupling fibers 24 and 26. Thus, the coupling delay time of the interconnecting (24, 26) and self feedback (30, 32) fibers are all approximately equal. FIG. 6B shows three coupled ring lasers each with a self-feedback loop.

Figure 7A:
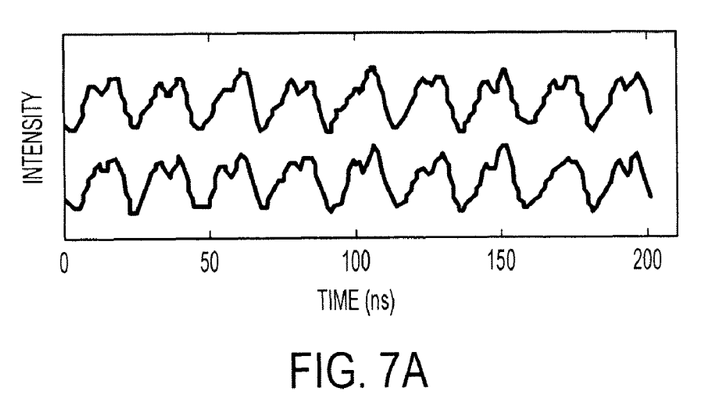
FIGS. 7A-D show time traces of 2 lasers for a single round trip for both the system without self feedback, and the system with self feedback according to the invention.
Figure 7B:
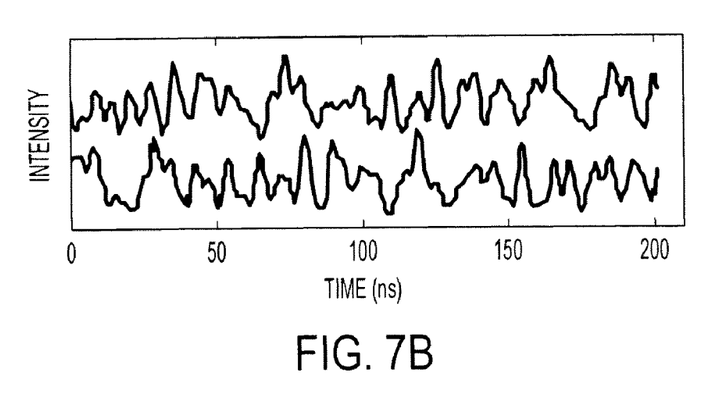
Figure 7C:
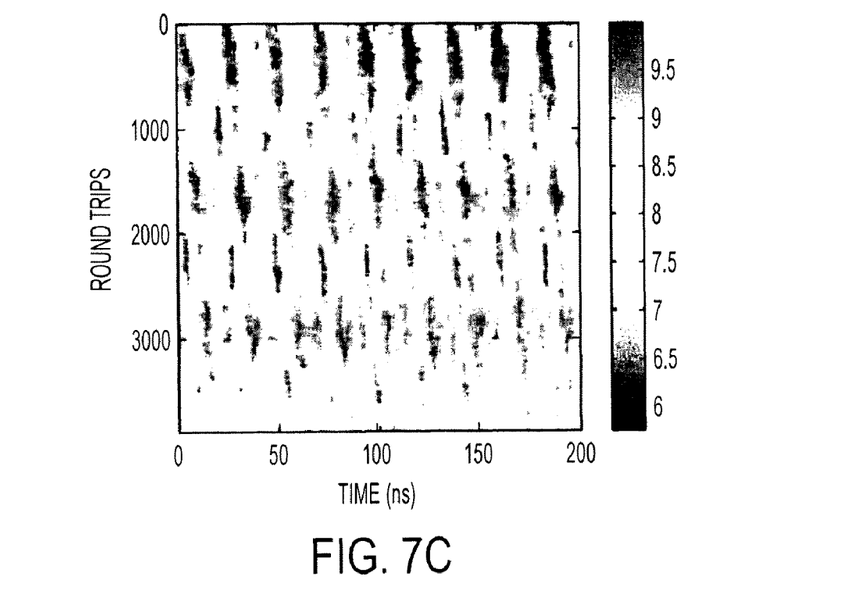
Figure 7D:
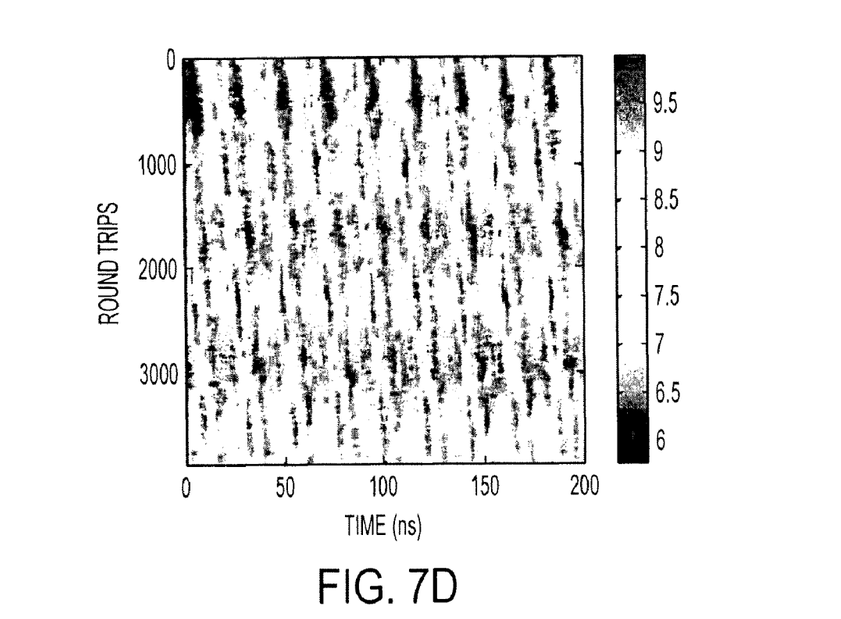

FIGS. 7A-D show time traces of the N=2 lasers for a single round trip for both the system with self feedback described here and the system without self feedback ($\kappa_f=0$). Intensity (arbitrary units) for two lasers coupled with $\kappa=0.009$. Each of FIGS. 7A and B panels are intensity vs. time for laser 1 (bottom curve in each figure), and for laser 2 (top curve in each figure), and where FIG. 7A is with self feedback, and FIG. 7B is without self feedback. Spatio-temporal plots corresponding to coupling with self feedback are FIG. 7C for laser 1 and FIG. 7C for laser 2. Isochronal synchrony can been seen when self feedback is included, while in the absence of self feedback the lasers are delay synchronized. The spatio-temporal plots in FIGS. 7C-D are nearly identical due to the isochronal synchrony. To quantify the synchrony, we align the time traces for the two lasers with various time shifts between them. In the absence of self feedback, the peak cross-correlation occurs when the lasers are shifted relative to each other by the delay time. The cross-correlation is low when the lasers are compared with no time shift. In contrast, when self feedback is included, the lasers achieve a high degree of correlation when compared isochronally. For the time traces shown in FIG. 7A, the peak cross-correlation of 0.9554 occurs when there is no time shift, although the cross-correlation when shifted by the delay time is near as high (0.9549).

Figure 8:
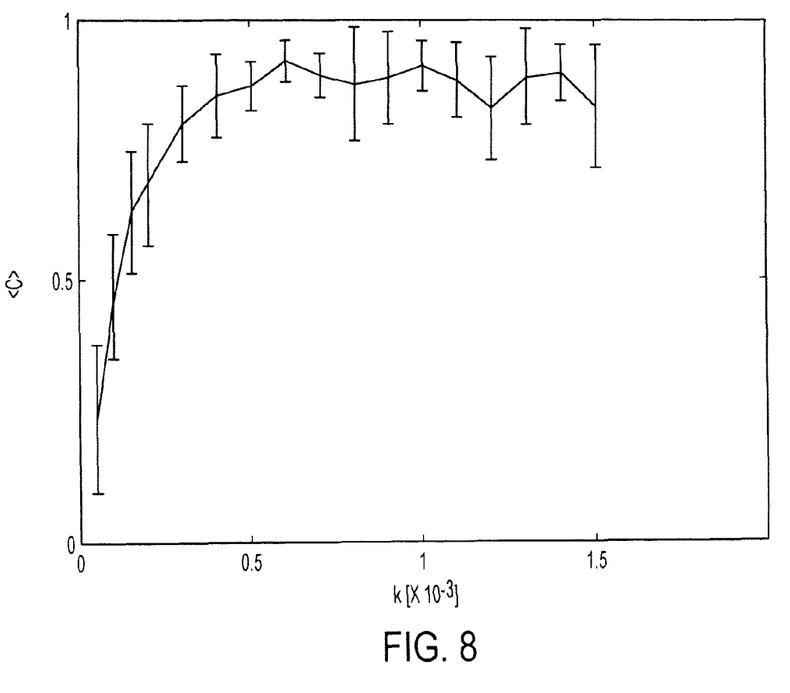
FIG. 8 shows the computed average cross-correlation of two lasers with self feedback when the lasers are compared isochronally according to the invention.

We have swept the coupling strength κ for the system of two lasers with self feedback and computed the average cross-correlation when the lasers are compared isochronally. FIG. 8 shows that the lasers are well synchronized for input strengths as small as 0.1%. This is in contrast to the model without self feedback and with detuning between lasers, which requires coupling strengths on the order of 1% to achieve delay synchrony.

Figure 9:
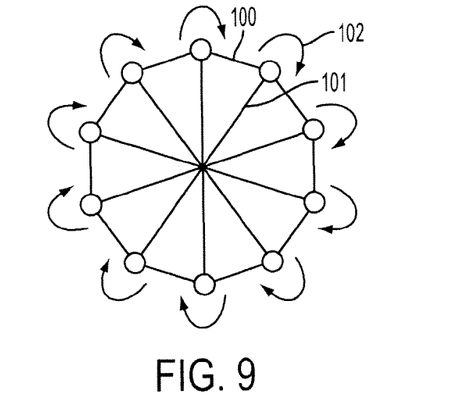
FIG. 9 coupling for 10 lasers according to the invention.

FIG. 6B shows how the invention is applied in a global, or all-to-all, coupling scheme for N=3 fibers. For N=3 fiber ring lasers, we have done a similar computation for cases with and without self feedback (not shown). We found that when the lasers are coupled globally without self feedback, the isochronal state will still synchronize. However, adding self feedback will cause the isochronal state to stabilize at somewhat lower values of coupling. Even without global coupling, such as for N=3 fiber lasers coupled in a linear configuration, addition of self feedback led to isochronal synchrony. FIG. 9 shows coupling for 10 lasers each with a self-feedback loop. The coupling scheme is nearest neighbor 100 plus cross-coupling 101, with the addition of self-feedback coupling 102 applied to each laser.

Figure 10:
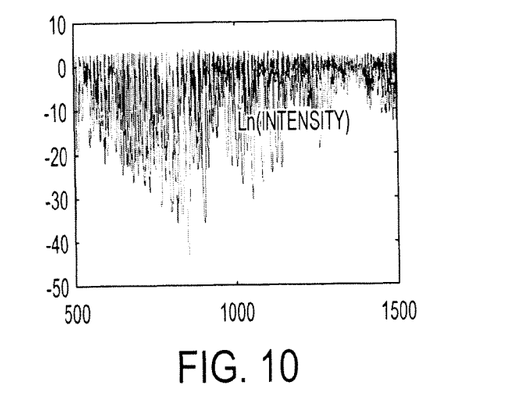
FIG. 10 shows the output of coupled lasers without the self-feedback.
Figure 11:
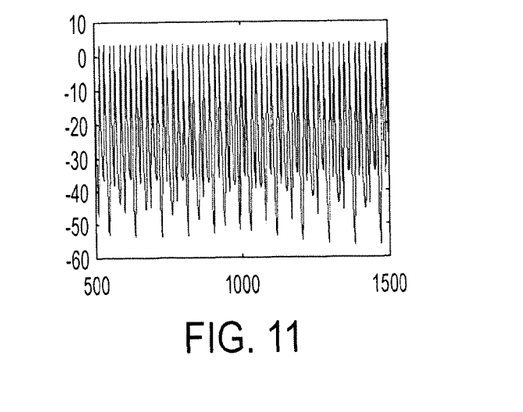
FIG. 11 shows the output of coupled lasers with the self-feedback according to the invention.

FIG. 10 shows the output of coupled lasers without the self-feedback. FIG. 11 shows the output with self-feedback, where it is evident that the lasers are substantially completely synchronous.

Thus, while the present invention has been described with respect to exemplary embodiments thereof, it will be understood by those of ordinary skill in the art that variations and modifications can be effected within the scope and spirit of the invention. For example, as stated above. the invention has applications in receivers and transmitters used in communications systems, in mobile tactical high energy laser systems, maritime self defense applications, counter munitions, and coherent beam control. Accordingly, it includes other components known to those of ordinary skill in the art to be capable of processing the output signal of the invention, such as a microwave oscillator, a microwave T/R, and an acoustic T/R (not illustrated).

What is claimed as new and desired to be protected by Letters Patent of the United States is:

1. A synchronized delay-coupled laser system, comprising:
   three or more lasers, wherein each of said lasers is coupled to at least one other laser and wherein the three or more coupled lasers satisfy the condition $$\frac{d\eta_{ij}(t)}{dt} = D_1 F(x_i(t), x_i(t-\tau))\eta_{ij}(t)$$

where the arguments of the derivatives are computed along a synchronized solution s(t) to generate a set of nonpositive transverse direction Lyapunov exponents whereby isochronal synchronization is obtained under laser system operation.

2. The laser system of claim 1, wherein each of said coupled lasers that are coupled together are coupled via a fiber amplifier coupled with a polarization controller.

3. The laser system of claim 1, wherein the three or more lasers comprise a linear configuration.

4. The laser system of claim 3, wherein each of the three or more lasers is a semiconductor laser.

5. The laser system of claim 1, wherein each of the three or more lasers is a fiber optic laser.

6. The laser system of claim 5, wherein each fiber optic laser includes a coupler for coupling to a laser light pump.

7. The laser system of claim 1, wherein the three or more lasers comprise a ring configuration.

8. The laser system of claim 7, wherein each of said coupled lasers that are coupled together are coupled via a fiber amplifier coupled with a polarization controller.

\* \* \* \* \*